(12) United States Patent
Charles et al.

(10) Patent No.: US 12,388,814 B2
(45) Date of Patent: Aug. 12, 2025

(54) MANAGEMENT METHOD FOR AUTHENTICATING A USER OF A DEVICE ON AN EQUIPMENT ITEM BY PASSWORD

(71) Applicant: ORANGE, Issy-les-Moulineaux (FR)

(72) Inventors: Olivier Charles, Chatillon (FR); Pascal Nourry, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 213 days.

(21) Appl. No.: 18/256,778

(22) PCT Filed: Dec. 2, 2021

(86) PCT No.: PCT/FR2021/052190
§ 371 (c)(1),
(2) Date: Jun. 9, 2023

(87) PCT Pub. No.: WO2022/123152
PCT Pub. Date: Jun. 16, 2022

(65) Prior Publication Data
US 2024/0098081 A1    Mar. 21, 2024

(30) Foreign Application Priority Data

Dec. 10, 2020    (FR) ..................... 2012981

(51) Int. Cl.
*H04L 9/40*    (2022.01)
*G06F 21/31*    (2013.01)
*H04L 9/08*    (2006.01)

(52) U.S. Cl.
CPC ........ *H04L 63/0838* (2013.01); *H04L 9/0861* (2013.01); *H04L 9/0869* (2013.01)

(58) Field of Classification Search
CPC . H04L 9/0861; H04L 9/0869; H04L 63/0838; H04L 9/40; H04L 9/08; G06F 21/31
See application file for complete search history.

(56) References Cited

U.S. PATENT DOCUMENTS 8,209,744 B2 *   6/2012   Zhu ..................... H04L 63/0838
                                                         713/172
8,582,762 B2 *  11/2013   Holtmanns ........... H04L 9/0861
                                                         713/171

(Continued)

OTHER PUBLICATIONS

International Search Report dated Apr. 5, 2022 for corresponding International Application No. PCT/FR2021/052190, filed Dec. 2, 2021.

(Continued)

*Primary Examiner* — Jayesh M Jhaveri
(74) *Attorney, Agent, or Firm* — David D. Brush; Westman, Champlin & Koehler, P.A.

(57) ABSTRACT

A management method for authenticating a user of a device on an equipment item that is accessed by password. The method includes: acquiring a first password by the equipment item, the password being a result of a calculation based on a first secret data item; access by the user to the equipment item, which includes: the equipment item receiving a second password which is calculated by the device based on a second secret data item; and authenticating the user of the device on the equipment item if the second password received during the receiving corresponds to the first password obtained during the acquisition.

14 Claims, 2 Drawing Sheets

(56) References Cited

U.S. PATENT DOCUMENTS

| | | | |
|---|---|---|---|
| 11,657,365 B2 * | 5/2023 | Santangeli | G07C 9/00309 |
| | | | 705/339 |
| 2007/0253553 A1 * | 11/2007 | Abdul Rahman | G06Q 20/4014 |
| | | | 380/259 |
| 2015/0154595 A1 | 6/2015 | Collinge et al. | |
| 2017/0017957 A1 * | 1/2017 | Radu | G06Q 20/4012 |
| 2017/0330184 A1 * | 11/2017 | Sabt | G06Q 20/327 |
| 2018/0255053 A1 * | 9/2018 | Bhabbur | H04L 9/3228 |
| 2019/0036913 A1 * | 1/2019 | Tzur-David | H04L 63/18 |
| 2022/0377061 A1 * | 11/2022 | Raghunath | G06F 21/45 |

OTHER PUBLICATIONS

Written Opinion of the International Searching Authority dated Apr. 5, 2022 for corresponding International Application No. PCT/FR2021/052190, filed Dec. 2, 2021.

English translation of the Written Opinion of the International Searching Authority dated Apr. 5, 2022 for corresponding International Application No. PCT/FR2021/052190, filed Dec. 2, 2021.

* cited by examiner

[Fig 1]
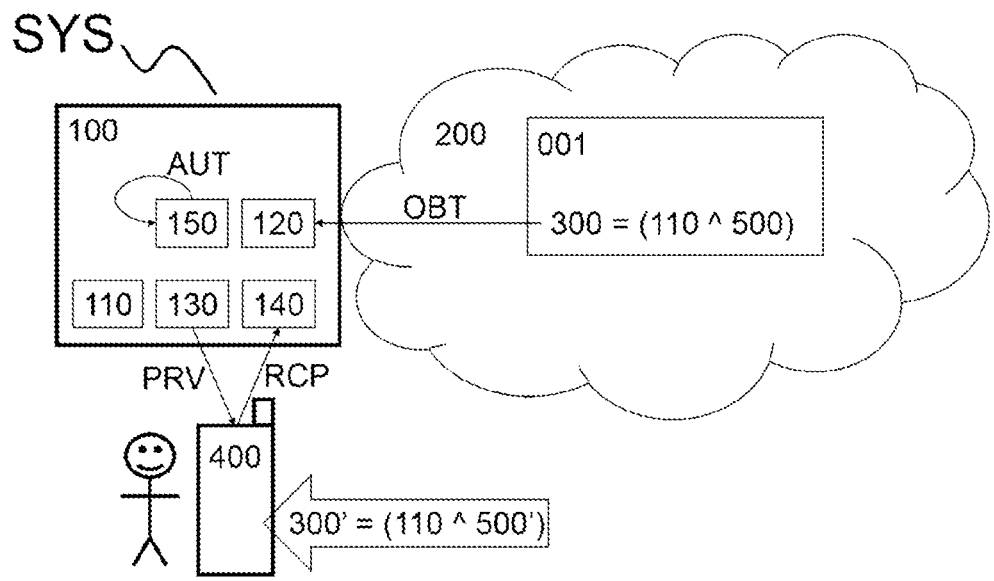
[Fig 2]
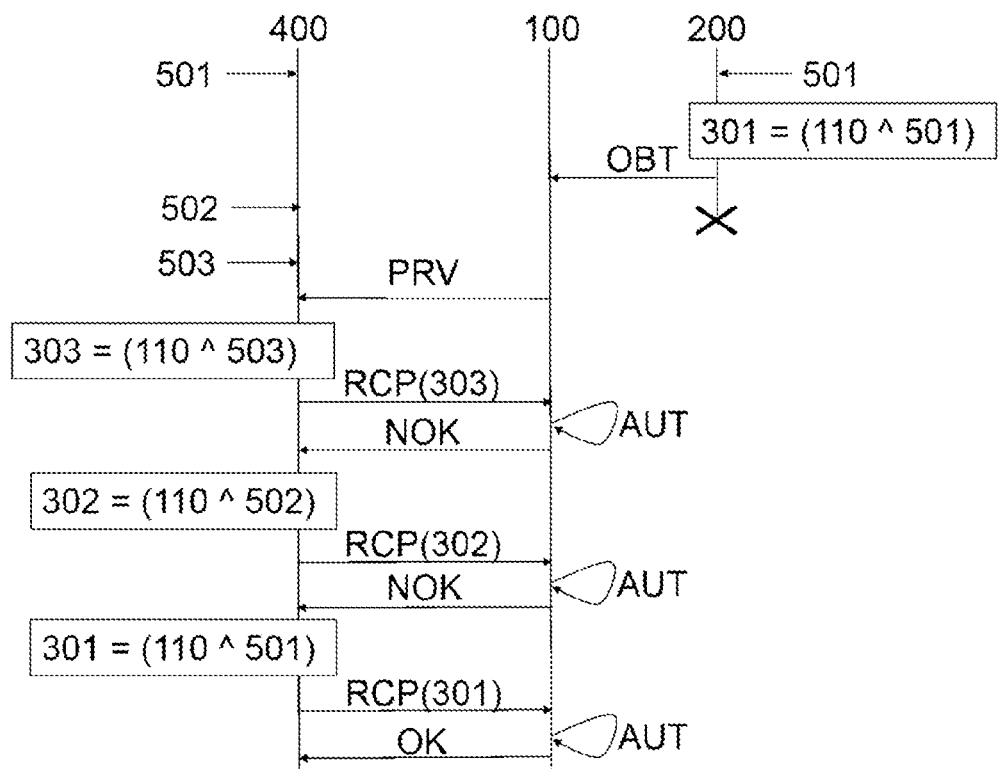

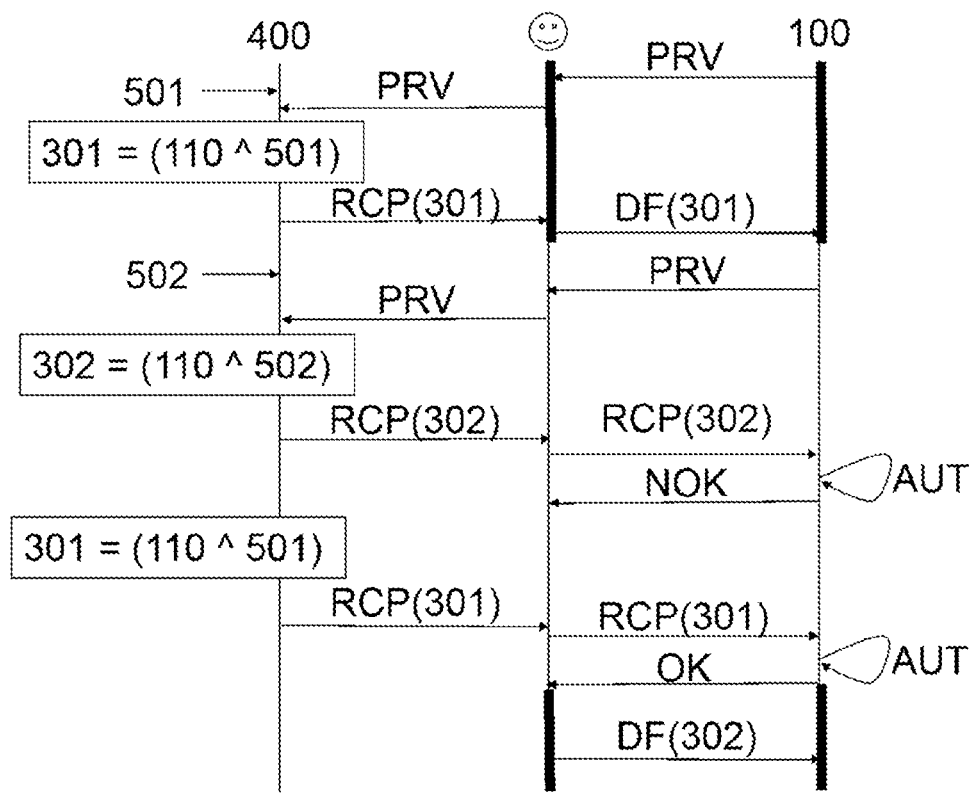
[Fig 3]

MANAGEMENT METHOD FOR AUTHENTICATING A USER OF A DEVICE ON AN EQUIPMENT ITEM BY PASSWORD

CROSS-REFERENCE TO RELATED APPLICATIONS

This application is a Section 371 National Stage Application of International Application No. PCT/FR2021/052190, filed Dec. 2, 2021, which is incorporated by reference in its entirety and published as WO 2022/123152 A1 on Jun. 16, 2022, not in English.

TECHNICAL FIELD

The technical field is that of authenticating a user by a password.

More specifically, the disclosure relates to a method for managing the authentication of a user of a device on an equipment by a password.

The equipment in question are initially equipment that form the infrastructures in the field of telecommunications, for example the routers of IP gathering networks, or even the equipment implementing SDH protocols, without being limited thereto. An embodiment of the disclosure most specifically applies to the infrastructures of the field of telecommunications, but can be applied to any infrastructure that is formed by a pool of equipment for which access is controlled by a password.

These equipment are generally distributed over the entire territory. They are generally connected by a communication network, which allows them to be administered remotely. This connection allows, for example, the password to be changed, which allows access to the equipment.

The aforementioned device will be, for example, a laptop computer, or even a touchscreen tablet, or even a smartphone. The device is made available to a user. In all cases, it will comprise a processor allowing it to carry out certain computations.

BACKGROUND

The infrastructures in the field of telecommunications, but also in the field of water distribution, or even of electricity distribution, are formed by vast pools of equipment distributed over the territory. The equipment forming these infrastructures very often have an access control system that is based on a password. These equipment generally have an account that allows them to be administered, with access to this account being protected by a password. Most often, each equipment has only one administration account and less often two or three at most. Within the scope of an exemplary embodiment of the disclosure, equipment with a single administration account can be considered and therefore the equipment is accessed only by virtue of a single password.

The user who is authenticated on the equipment is generally a maintenance technician who must be authenticated in order to carry out all possible types of operations, for example routine maintenance operations (checking correct operation), or even administration operations (change of password, change of software version) or even troubleshooting operations (re-launching certain software components). Authentication on the equipment is restricted by a password in order to protect access to these operations so that it is only granted to legitimate users.

The user, namely a technician responsible for maintenance, must be able to be authenticated on the equipment during maintenance, administration or troubleshooting operations that are carried out directly on the equipment, and not remotely. This authentication must be able to be provided even in the event of a fault in the communication network.

The users, namely technicians responsible for the maintenance of the equipment, therefore must know the passwords for all the equipment they oversee. For obvious reasons of practicality, a single password is often given to all the equipment of the pool. In this way, the technicians only have to memorize a single password.

This situation presents a clear security risk. Indeed, if a hacker knows the password of a single equipment it will grant them access to all the equipment of the pool, which would allow them to cause much greater damage. For security reasons, the intention therefore will be to attempt to distribute diverse passwords over the pool of equipment, ideally one for each equipment. This distribution of diverse secrets must occur, however, while remaining practical for the technicians responsible for maintenance.

The conventional way of distributing diverse passwords, while remaining practical for the users who have to know the passwords, is a system called OTP (One-Time Password) system. In this type of system, a device in the possession of the user regularly generates a new password. A central platform introduces the same password into the services to which the user can access, in a manner that is synchronized with the generation of the password.

An OTP system is not suitable for distributing diverse passwords in vast pools of equipment for two reasons.

Firstly, the OTP systems are used in cases in which many users of the system are faced with a limited number of services that the users access with a password. In the case of pools of equipment, this is a situation in which, on the contrary, a small number of users (a few dozen technicians) must access a large number of equipment (a few thousand equipment) with a password.

Secondly, an OTP system requires that the services accessed by the users have a network connection so that the central platform regularly introduces the passwords of the users. However, in the case of telecommunications networks, the interventions of technicians often occur during a network failure. In this case, it is not possible to count on the availability of a telecommunications network. More generally, the electricity and water distribution equipment can be located in isolated regions, again without permanent network access.

The use of an OTP system therefore does not solve the problem of distributing diverse passwords in a vast pool of equipment that does not have reliable access to a communication network.

One or more exemplary embodiments of the disclosure improves the situation.

SUMMARY

According to a first functional aspect, an exemplary embodiment of the disclosure relates to a method for managing the authentication of a user of a device on an equipment, with the equipment being accessed by a password, said method being characterized in that it comprises the following phases:
- a phase of acquiring a first password by the equipment, the password being the result of a computation from a first secret datum;
- a phase of the user accessing the equipment, which phase comprises:

a step of the equipment receiving a second password computed by the device from a second secret datum;

a step of authenticating the user of the device on the equipment if the second password received during the receiving step corresponds to the first password acquired during the acquisition phase.

By virtue of an exemplary embodiment, the user no longer needs to memorize the password that allows them to be authenticated by the equipment. It is the device that the user is provided with that computes the password in question.

In addition, by virtue of an exemplary embodiment, the password is computed from a secret datum. A hacker who does not know the secret datum therefore could not find the password only on the basis of knowledge of the computation process.

It should be noted that the phase of acquiring a first password can be carried out independently of the access phase. Preferably, as will be seen in the examples described hereafter, this phase of acquiring a first password will precede the access phase.

Again, according to a first particular embodiment, the first secret datum used during the acquisition phase varies over time, and the second secret datum is updated on the device in order to be synchronous with the first secret datum.

By virtue of this first embodiment, the password granting access to the equipment will change over time, which reduces the risk of a hacker eventually acquiring the correct password. In order for the user of the device to be able to authenticate, the secret datum must be regularly updated, so that the password computed by the device is the same as that acquired by the equipment.

According to a second particular embodiment, which can be implemented alternatively or cumulatively with the previous embodiment, password values are successively received by the equipment until the authentication step is successful.

In this second embodiment, the device stores the successive values of the secret datum used to compute the password. It is possible that the equipment has not been able to acquire the computed password with the most recent value of the secret datum, for example because the communication network that allows the equipment to acquire the password is faulty. In this case, the device will firstly compute the password from the most recent value of the secret datum. In the event of a failure to authenticate on the equipment with this password, the device will iteratively compute other passwords by using older values of the secret datum, until the authentication on the equipment succeeds with a computed password. For these computations the device will use, for example, the values of the secret datum starting from the most recent and by iterating up to the oldest. By virtue of this particular embodiment, the capacity for the user to be authenticated copes with any faults in the communication network that prevent the equipment from acquiring the most up-to-date value of the secret datum.

According to a third particular embodiment, which can be implemented alternatively or cumulatively with the previous embodiments, the acquisition phase is carried out via a communication network, and, in the event of an interruption in the communication network, the value of the second secret datum selected by the device depends on the duration of the interruption in order to correspond to the value used for computing the password most recently acquired by the equipment.

By virtue of this particular embodiment, the capacity for the user to be authenticated even when there are faults in the communication network is improved.

According to a fourth particular embodiment, which can be implemented cumulatively with the previous embodiments, the equipment belongs to a pool of equipment, with the equipment having unique identifiers. In this configuration, the password acquired by the equipment is computed by a server from the unique identifier and from a secret datum using a cryptographic function, and the phase of the user accessing the equipment comprises a prior provision step, during which the equipment provides the device with its unique identifier.

A cryptographic function ensures that the password resulting from the computation will be different each time a different identifier is used and also that it is impossible for a hacker to discover the password without knowing the secret datum. By virtue of this embodiment, diverse passwords can be distributed, which are different for each equipment within the pool. Moreover, by virtue of this embodiment and the nature of a cryptographic function, a hacker who would know only the identifier of the equipment and the computation process, but not the secret datum, would not find the password resulting from the computation.

According to a second functional aspect, an exemplary embodiment relates to a method for accessing an equipment by a device, with said equipment requiring a password in order to be accessed, said first password having been computed from a first secret datum, said access method comprising:

a step of computing, by the device, a second password from a second secret datum;

a step of transmitting, by the device, the second password to the equipment.

By virtue of this aspect of the disclosure, the user no longer has to memorize the password that will allow them to be authenticated on the equipment. It is the device of the user that will compute the password that will allow them to be authenticated.

According to a first embodiment of this second aspect of the disclosure, the second secret datum is updated on the device over time in order to be synchronous with the first secret datum used by the equipment.

By virtue of this first embodiment, the secret datum present in the device is regularly updated, in order to ensure that the value of the secret datum that has been used to compute the password of the equipment is indeed present in the device. In this way, the password of the equipment can change over time, which reduces the risk of a hacker eventually acquiring the correct password, while allowing the user of the device to be authenticated.

According to a second particular embodiment of this second aspect of the disclosure, which can be implemented alternatively or cumulatively with the previous embodiment, the device stores several past values of the second secret datum, and the computation of the password by the device is based on one of these values.

In this embodiment, the device stores the successive values of the secret datum used to compute the password. Indeed, as previously indicated, it is possible that the equipment has not been able to acquire the password computed with the most recent value of the secret datum, for example because the communication network that allows the equipment to acquire the password is faulty. In this case, the device will firstly compute the password from the most recent value of the secret datum, then, if the authentication fails, the device will use increasingly older values, until the authentication is successful. By virtue of this particular embodiment of the disclosure, the capacity for the user to be authenticated copes with any faults in the communication network that prevent the equipment from acquiring the most up-to-date value of the secret datum, since the device stores the past values of the secret datum in a memory.

According to a third particular embodiment of this aspect of the disclosure, the equipment accessed by the device acquires the first password via a communication network, and, in the event of an interruption in the communication network, the value of the second secret datum selected by the device depends on the duration of the interruption in order to correspond to the value used for computing the first password most recently acquired by the equipment.

By virtue of this particular embodiment of the disclosure, the capacity for the user to be authenticated even in the event of faults in the communication network is improved.

According to a fourth particular embodiment of this aspect of the disclosure, the equipment accessed by the device belongs to a pool of equipment, with the equipment having unique identifiers, and the first password acquired by the equipment accessed by the device is computed by a server from the unique identifier and from a first secret datum using a cryptographic function. In this particular embodiment, the phase of the user of the device accessing the equipment comprises a prior provision step, during which the equipment provides the device with its unique identifier, and the device computes the second password from the unique identifier and from a second secret datum using the same cryptographic function.

By virtue of this embodiment, the device will compute diverse passwords, which are different for each equipment within the pool. Moreover, by virtue of this embodiment and the nature of a cryptographic function, a hacker who would know only the identifier of the equipment and the computation process, but not the secret datum, would not be able to find the password resulting from the computation.

According to a first hardware aspect, the disclosure relates to an equipment managing the authentication of a user of a device, with the equipment being accessed by a password, characterized in that the equipment comprises:
  an acquisition module for acquiring a first password, the password being the result of a computation from a first secret datum;
  a reception module able to receive a second password computed by the device from a second secret datum;
  an authentication module able to authenticate the user of the device on the equipment if the acquired first password corresponds to the received second password.

According to a particular embodiment of this first hardware aspect, the equipment belongs to a pool of equipment and is provided with a unique identifier and further comprises a provision module able to provide the device with the unique identifier.

According to a second hardware aspect, the disclosure relates to a device allowing a user to access an equipment, with said equipment requiring a password in order to be accessed, said first password having been computed from a first secret datum, said device being characterized in that it comprises:
  a module for computing, by the device, a second password from a second secret datum;
  a module for transmitting, by the device, the second password to the equipment.

According to a particular embodiment of this second hardware aspect, the device further comprises a reception module able to receive an identifier of an equipment, and the computing module of the device computes the second password from the identifier and from a second secret datum.

According to another hardware aspect, the disclosure relates to a computer program able to be implemented by an equipment, the program comprising code instructions and which, when it is executed by a processor, carries out the steps of the management method defined above.

According to another hardware aspect, the disclosure relates to a computer program able to be implemented by a device, the program comprising code instructions and which, when it is executed by a processor, carries out the steps of the access method defined above.

Finally, according to another hardware aspect, the disclosure relates to data media, on which computer programs are recorded comprising sequences of instructions for implementing the management and access methods defined above.

The data media can be any entity or device capable of storing the programs. For example, the media can include a storage means, such as a ROM, for example a CD-ROM or a microelectronic circuit ROM, or even a magnetic recording means such as a hard disk. Furthermore, the media can be transmissible media such as an electrical or optical signal, which can be routed via an electrical or optical cable, by radio or by other means. The programs according to the disclosure particularly can be downloaded over a network such as the Internet. Alternatively, the information medium can be an integrated circuit in which the program is incorporated, with the circuit being adapted to execute or to be used to execute the method in question.

BRIEF DESCRIPTION OF THE DRAWINGS

One or more exemplary embodiments of the disclosure will be better understood upon reading the following description, which is provided by way of an example, and with reference to the accompanying drawings, in which:

FIG. 1 shows a system made up of an equipment and a user provided with a device on which an embodiment of the disclosure is illustrated.

FIG. 2 illustrates an example of steps implemented within the scope of an embodiment of the disclosure.

FIG. 3 illustrates another example of steps implemented within the scope of another embodiment of the disclosure.

DETAILED DESCRIPTION OF ONE OR MORE EXEMPLARY EMBODIMENTS OF THE DISCLOSURE

FIG. 1 shows a computer system SYS including an equipment 100. This equipment can be, for example, a router or an SDH equipment or even an equipment of a base station in the field of telecommunications. In other technical fields, the equipment can be, for example, an electrical distribution equipment or even a water sanitation equipment.

Even if an embodiment of the disclosure can be carried out on an isolated equipment 100, an embodiment is of interest when the equipment 100 belongs to a pool of equipment. In this case, the equipment 100 is preferably provided with a unique identifier 110. This unique identifier 110 will be used when computing passwords to ensure that the equipment 100 acquire their own password. An embodiment of the disclosure then ensures that the passwords of the equipment 100 are diverse within the pool of equipment. Throughout the following description, the example that is systematically used is the case whereby the equipment 100 belongs to a pool of equipment and is provided with an identifier 110.

The equipment 100 has the hardware architecture of a conventional computer. It particularly comprises a processor, a RAM-type random access memory and a read-only memory, such as a Flash- or ROM-type memory (not shown in the figure), as well as input/output devices, such as keyboards and/or screens (not shown in the figure).

The equipment 100 has an identifier 110. In this example, as the equipment 100 forms part of a pool of equipment, this identifier 110 is preferably unique for each equipment within the pool. The identifier 110 typically will be a series of alphanumeric characters, of sufficient length, which can be used as an argument of a cryptographic function.

In this example, the system SYS includes a server 001 that is connected to the equipment 100 by a communication network 200. It will be seen hereafter that the presence of a server is not compulsory in all the embodiments of the disclosure. The server 001 can compute a password 300 from the identifier 110 and from a secret datum 500. The password 300 then can be transmitted via a communication network 200 to the equipment 100. It also will be seen hereafter that embodiments of the disclosure can operate without a communication network 200 and in any case that the disclosure overcomes the faults in the network.

The equipment 100 acquires the password 300 by virtue of an acquisition module 120. This acquisition module 120 can be formed, for example, by a system for receiving messages conveyed by the communication network 200, made up of an antenna and a 2G to 5G wireless communications receiver, but any other way of providing the equipment 100 with a password 300 can be considered.

The equipment 100 comprises an authentication module 150 able to carry out an authentication. This authentication module 150 carries out a standard password authentication. The password 300 acquired via the acquisition module 120 is stored by the authentication module 150 in a protected form, for example as a result of the computation of a hash function. The password 300 will then be that which will have to be presented in order to be authenticated on the equipment 100.

The system SYS includes a data processing device 400 that has the hardware architecture of a conventional computer. The device particularly comprises a processor, a RAM-type random access memory and a read-only memory, such as a Flash- or ROM-type memory (not shown in the figure), as well as input/output devices, such as keyboards and/or screens (not shown in the figure), which may or may not be touchscreens, or real or virtual. This device 400 will be, for example, a laptop computer, or even a touchscreen tablet, or even a smartphone.

The equipment 100 has a provision module 130 that will allow it to provide the device 400 with the identifier 110. It is possible to contemplate several means by which the equipment 100 can provide the device 400 with its identifier 110. For example, the provision can involve using a Bluetooth connection. Another way of carrying out this step can be by displaying the identifier in the form of a QR Code. If the device 400 of the user is a smartphone provided with a camera, they can then read it directly. In a minimal mode, the identifier 110 of the equipment 100 will be displayed on a tag that can be seen by the user, in the form of an alphanumeric character string, and will then be entered in the device 400 by the user by virtue of a real or a virtual keyboard.

The device 400 comprises a reception module (not shown in FIG. 1) that allows it to receive the identifier 110.

The device 400 also comprises a computation module (not shown in FIG. 1) that allows it to compute the password 300' from the identifier 110 and from a secret datum 500'.

The device 400 also comprises a transmission module (not shown in FIG. 1) that allows it to transmit the password 300' to the equipment 100.

The equipment 100 further comprises a reception module 140 able to receive data transmitted by the transmission module of the device 400.

The equipment 100 communicates with the server 001 through a first communication link 200. This first link is equally a telecommunication network such as the Internet network.

The equipment 100 and the device 400 communicate with each other through a second short-range communication link (not shown in FIG. 1), such as a Bluetooth, RFiD, etc., link.

As an alternative embodiment, the two aforementioned links could be the same communication link.

An embodiment of the disclosure requires the availability of a secret datum 500. The secret datum 500 also typically will be a series of alphanumeric characters of sufficient length, as well as the identifier 110. In general, the secret datum 500 will assume a series of different values over time, but this is not essential to the embodiment of the disclosure. In FIG. 1, a single value of the secret datum 500 is shown, which simplifies the presentation of an exemplary embodiment of the disclosure.

It is possible to compute a password 300 from the identifier 110 and the secret datum 500. As will be explained hereafter, with reference to a particular embodiment of the disclosure, the computation that produces the password will typically involve applying a cryptographic function to a combination of the identifier 110 and the secret datum 500. In FIG. 1, the computation operation is shown by the symbol A. The computation operation is not necessarily limited to a cryptographic function, but can be any deterministic operation that will yield the same result for identical arguments.

In FIG. 1, the password 300 is computed by the server 001. The equipment 100 acquires, during a step OBT, the password 300 by virtue of the acquisition module 120 described above.

Once acquired by the equipment 100, the password 300 is saved by the authentication module 150. This authentication module 150 carries out a standard password authentication. The password 300 acquired via the acquisition module 120 is stored by the authentication module 150 in a protected form, for example as a result of the computation of a hash function.

Still with reference to FIG. 1, the user seeking to be authenticated on the equipment 100 is shown. The user is provided with a device 400. In this example, the equipment 100 provides, during a step referenced PRV, the device 400 with its identifier 110.

After receiving the identifier 110, the device 400 can carry out the same computation of the password 300'. This operation is referenced in FIG. 1 by the arrow labeled with the computation operation that provides the password 300'. This operation is carried out by a computation module (not shown in FIG. 1) of the device 400.

The device 400 must use the same computation operation as that used beforehand so that the equipment 100 acquires the password 300, for example a cryptographic function as will be seen hereafter. Again, the computation operation is shown in FIG. 1 by the symbol ^. The device also uses a secret datum 500'. If this secret datum 500' is identical to that used by the equipment 100 to acquire its password, the password 300' computed by the device 400 of the user will be equal to the password 300 acquired by the equipment 100.

This highlights an advantage of the disclosure, namely its practicality. The user does not have to memorize a diverse password for all the equipment of the pool. It is the device 400 available to the user that carries out the computation that will allow it to know the password 300. This password can be diverse, because it is computed from the identifier 110 of the equipment, which is different for all the equipment of the pool. This password is also accessible only to legitimate users, which have the device 400 that has access to the secret datum 500'. A hacker will not be able to compute the password 300 only from the identifier 110 of the equipment 100, without access to the device 400 and to the secret datum 500 if the computation operation has good cryptographic properties.

Once the computation is carried out by the device 400, the equipment 100 will receive the password 300', during a step RCP, for example by using a network connection or even a Bluetooth connection. In a minimal mode, it is the user who will transmit the password to the equipment 100, by reading the result of the computation on their device 400, and by entering the password 300' via a keyboard attached to the equipment 100 or by any other means.

The equipment 100 thus authenticates the user of the device 400. The authentication operation is referenced in FIG. 1 using the arrow AUT. This operation is carried out by the authentication module 150. The authentication succeeds if the password 300' computed by the device 400 of the user and received by the reception module 140 of the equipment 100 is the same as that acquired beforehand by the acquisition module 120 of the equipment 100. To this end, as the identifier 110 of the equipment 100 used in both computations is the same, the secret datum 500' used in the computation carried out by the device 400 must be equal to the secret datum 500 used in the computation carried out by the server 001.

The authentication is carried out by the authentication module 150. Said module carries out a standard password authentication.

FIG. 2, for its part, shows an embodiment including a succession of steps required for carrying out an authentication, taking into account the variability of the secret datum and the possibility of faults in the communication network 200.

Indeed, in order to improve the security of an embodiment of the disclosure, it is preferable for the value of the secret datum to vary over time. In this way, a hacker who at one moment would know a value of the secret datum would not be able to permanently have the passwords of the equipment. In FIG. 2, successive values of the secret datum are noted 501, 502 and 503.

The first value 501 of the secret datum is used to compute a first value 301 of the password. This value 301 is supplied to the equipment 100 via the communication network 200. A fault in the communication network 200 is then assumed, as symbolized in FIG. 2 by the cross that interrupts the line 200.

In this example, the device 400 then receives the expected successive values 501, 502 and 503 of the secret datum in order to be synchronous with the value of the secret datum used to provide the equipment 100 with its password. With the fault in the communication network 200 having prevented the equipment 100 from receiving the expected values 502 and 503, it will be seen that the embodiment of the disclosure allows an authentication to be maintained even in the event of a fault in the communication network.

When the user of the device 400 wishes to be authenticated on the equipment 100, said equipment supplies the device 400 with the identifier 110 as explained previously, during a provision step referenced PRV. The device 400 will compute the password from the current value 503 of the secret datum and will acquire the value 303.

As in FIG. 1, the equipment 100 receives, during a reception step referenced RCP(303), the password 303 that has just been computed by the device. The value 303 of the password received by the equipment 100 during the reception operation is indicated between brackets. Since this value is different from the value 301 acquired beforehand by the equipment 100, the authentication module 150 (not shown in FIG. 2) of the equipment 100 will refuse the authentication of the user of the device 400. This is indicated in FIG. 2 by the equipment 100 transmitting an NOK response to the device 400.

According to one embodiment of the disclosure, the device 400 stores all the values assumed over time by the secret datum. The device can attempt to find which value was most recently used to compute a password provided to the equipment 100 if the fault periods of the communication network 200 are known by the device 400. FIG. 2 shows a simpler means of carrying out the authentication in the event of faults in the communication network 200. The device 400, following the failure of the authentication with the password 303 computed with the value 503 of the secret datum, will go back over the values acquired over time until the authentication succeeds. In the example of FIG. 2, after having received an NOK response, the user will then submit the computed password 302 with the value 502 of the secret datum, which will fail, and then the password 301 computed with the value 501 of the secret datum. These operations are respectively referenced in FIG. 2 by the arrows RCP(302) and RCP(301), which indicate the successive values 302 and 301 of passwords received by the equipment 100. The value 301 allows it to pass the authentication, which is indicated in FIG. 2 by the response, referenced OK, from the equipment 100 to the device 400, since it is this value 301 of the password that was acquired by the equipment 100 before the fault in the communication network 200.

Another embodiment of the disclosure, shown in FIG. 3, can be implemented without an additional server in addition to the equipment 100 and the device 400, or without any connection of the equipment 100 with a communication network 200.

In this embodiment, the user (shown in FIG. 3 by an emoticon) is a maintenance technician for the equipment 100. As such, the user is able to access operations for maintaining the equipment 100 when they have been successfully authenticated thereon. FIG. 3 shows that the user is authenticated on the equipment 100 using thick, parallel lines between the user and the equipment 100.

Initially, the user is authenticated on the equipment 100 during the phase of starting the equipment 100. In FIG. 3, the step PRV is carried out by means of the user and is split into two arrows. The user can read the identifier 110 of the equipment 100, for example on a dedicated tag, and then transmit it to their device 400, for example via a real or virtual keyboard, which is referenced in FIG. 3 using two arrows PRV. It is also possible for the equipment 100 to directly provide the reception module of the device 400 with the identifier 110 via a Bluetooth connection, or via a QR Code mechanism.

The device 400 also has a value 501 of the secret datum. This value can be, for example, the initial value of a random series of possible values that has been predetermined. This value also can be defined from a predetermined computation mode from the current date.

As previously, the device 400 firstly computes the value 301 of the password from the identifier 110, provided by the equipment 100 during a step PRV, and from the value 501 of the secret datum. The device displays this value 301 to the user via a screen. It is considered that the user receives this value of the password in a reception operation referenced RCP(301). The user will then define the password of the equipment 100 as assuming the value 301. This operation of defining the password is referenced in FIG. 3 by the arrow DF(301). This operation of defining the password is only accessible to the user when they are authenticated on the equipment 100, which is the case in this start-up phase. This operation of defining the password of the equipment 100 is one operation from among the operations for maintaining the equipment 100 only accessible to users who have passed an authentication phase on the equipment 100.

In this example, the user will then naturally disconnect from the equipment 100.

In FIG. 3, in this example, single (not thick) lines, which are parallel between the user and the equipment 100, show that the user is no longer authenticated on the equipment.

With the value of the secret datum varying over time, said secret datum will assume new values.

In FIG. 3, only one new value 502 of the secret datum is shown.

When the user wishes to be authenticated on the equipment 100 once again, they will firstly provide the device 400 with the identifier 110 of the equipment 100, as previously, during a step PRV. In FIG. 3, the step PRV is carried out via the user and is split into two arrows, and involves, for example, the user reading the identifier 110 on a tag of the equipment 100, followed by an entry via a keyboard of the device 400. It has been previously seen that this step PRV alternatively could be carried out by a direct communication between the equipment 100 and the device 400, for example via a Bluetooth link or any other means.

Once the value 302 is computed from the identifier 110 and the secret datum 502, the secret datum is received by the user, during a step RCP(302), who will then transmit it to the equipment 100 in an operation also referenced RCP(302). In FIG. 3 the reception operation RCP is considered to be carried out via the user, who will, for example, read the value 302 on the screen of the device 400, then enter this value 302 into the equipment 100 via a keyboard, which is referenced by the two arrows RCP(302). Alternatively, the reception operation RCP(302) could be carried out directly between the device 400 and the equipment 100 via a Bluetooth link or any other means.

Once the value 302 of the password is received by the equipment 100, the equipment will proceed with an authentication operation. This authentication operation is referenced in FIG. 3 by the arrow AUT. This operation is carried out by the authentication module 150 (not shown in FIG. 3) of the equipment 100. The authentication operation will fail as indicated by the NOK response in FIG. 3.

As in the embodiment described in FIG. 2, the user will ask the device 400 to go back and use the previous stored values of the secret datum. The authentication will succeed when the user will submit the password 301 computed by the device 400 from the identifier 110 and from the value 501 of the secret datum. The operation of receiving the value 301 of the password by the equipment 100 is referenced by two arrows RCP(301) because it is again carried out via the user. The operation RCP(301) alternatively can be carried out by a direct link between the device 400 and the equipment 100.

Once the user is authenticated on the equipment, which is shown in FIG. 3 by the OK response and by a double thick line, the user can access the operations for maintaining the equipment 100 accessible only to legitimate users following the success of an authentication phase.

According to another embodiment of the disclosure described herein, the user updates the password on the equipment 100 by providing it with the value 302. This maintenance operation is symbolized in FIG. 3 by the arrow DF(302). In this way, even if the equipment 100 is not connected to a communication network 200, whether this is following a fault or because such a network is not available, the equipment 100 will acquire, as maintenance operations are carried out, a password 300 computed with the most recent value of the secret datum 500. In this way, the secret datum accessible on the device 400 is synchronous with the secret datum used to compute the password of the equipment 100.

According to another embodiment, the computation that produces the password will typically involve applying a cryptographic function to a combination of the identifier 110 and the secret datum 500. This cryptographic function can be, for example, a hash function, or even a symmetrical or asymmetrical encryption function, which may or may not be combined, if necessary, with truncation functions.

In FIGS. 1, 2 and 3, the computation operation is shown by the symbol ˆ. The computation operation takes the identifier 110 and the secret datum 500 as an argument, which are typically series of alphanumeric characters.

The resulting password also typically will be a series of alphanumeric characters, of sufficient length so that the password is a strong password, but not too long either if the equipment only accepts passwords with a size that is limited by a maximum length. When the equipment 100 belongs to a pool of equipment, the identifiers 110 of the equipment are different from one another within the pool of equipment, and, by virtue of the properties of the cryptographic function used to carry out the computation, the password 300 acquired by each equipment will be quite unique. One important advantage of an exemplary embodiment of the disclosure is that it allows diverse passwords to be acquired on a pool of equipment. In addition, the password 300 is computed from a secret datum 500 and, by virtue of the properties of a cryptographic function, a hacker cannot find the password 300 without having access to the secret datum 500. This is another advantage of an exemplary embodiment of the disclosure.

Finally, it should be noted that, in the present text, the term "module" can equally correspond to a software component and to a hardware component or a set of hardware and software components, with a software component itself corresponding to one or more computer programs or sub-programs or, more generally, to any element of a program able to implement a function or a set of functions as described for the relevant modules. In the same way, a hardware component corresponds to any element of a hardware assembly able to implement a function or a set of functions for the relevant module (integrated circuit, smart card, memory card, etc.).

Although the present disclosure has been described with reference to one or more examples, workers skilled in the art will recognize that changes may be made in form and detail without departing from the scope of the disclosure and/or the appended claims.

The invention claimed is:

1. A management method comprising:
    managing authentication of a user of a device on an equipment, with the equipment being accessed by a password, wherein:

the managing comprises the following phases:
    a phase of acquiring a first password by the equipment, the first password being a result of a computation from a first secret datum; and
    a phase of the user accessing the equipment comprising:
        the equipment receiving a second password computed by the device from a second secret datum; and
        authenticating the user of the device on the equipment in response to the second password received during the receiving corresponding to the first password acquired during the phase of acquiring;
    the phase of acquiring is carried out via a communication network; and
    in the event of an interruption in the communication network, a value of the second secret datum selected by the device depends on a duration of the interruption in order to correspond to a value used for computing the first password most recently acquired by the equipment.

2. The management method as claimed in claim 1, wherein the first secret datum used during the phase of acquiring varies over time, and the second secret datum is updated on the device in order to be synchronous with the first secret datum.

3. The management method as claimed in claim 1, wherein password values are successively received by the equipment until the authenticating is successful.

4. The management method as claimed in claim 1, wherein the equipment is a first equipment that belongs to a pool of equipment, which have unique identifiers, and wherein the password acquired by the first equipment is computed by a server from the unique identifier of the first equipment and from a secret datum using a cryptographic function, and wherein the phase of the user accessing the equipment comprises a prior provisioning, during which the first equipment provides the device with its unique identifier.

5. An access method comprising:
    accessing an equipment by a device, said equipment requiring a password in order to be accessed, a first password enabling access to the equipment having been computed from a first secret datum and acquired by the equipment, wherein:
    the accessing comprises:
        computing, by the device, a second password from a second secret datum; and
        transmitting, by the device, the second password to the equipment;
    the equipment accessed by the device acquires the first password via a communication network; and
    the method comprises, in the event of an interruption in the communication network, the device selecting a value of the second secret datum depending on a duration of the interruption in order to correspond to a value used for computing the first password most recently acquired by the equipment.

6. The access method as claimed in claim 5, comprising updating the second secret datum on the device over time in order to be synchronous with the first secret datum used by the equipment.

7. The access method as claimed in claim 5, comprising the device storing several past values of the second secret datum, and the computation of the second password by the device is based on one of the stored past values.

8. The access method as claimed in claim 5, wherein the equipment accessed by the device is a first equipment belonging to a pool of equipment, which have unique identifiers, wherein the first password acquired by the first equipment accessed by the device is computed by a server from the unique identifier of the first equipment and from the first secret datum using a cryptographic function, and wherein the device accessing the equipment comprises a prior provisioning, comprising the device receiving from the first equipment the unique identifier of the first equipment, and wherein the device computes the second password from the unique identifier of the first equipment and from the second secret datum using the same cryptographic function.

9. An equipment comprising:
    at least one processor; and
    at least one non-transitory computer readable medium comprising instructions stored thereon which when executed by the at least one processor configure the equipment to execute a method of managing authentication of a user of a device, the equipment being accessed by a password, wherein:
    the managing comprises:
        acquiring a first password, the first password being a result of a computation from a first secret datum;
        receiving a second password computed by the device from a second secret datum; and
        authenticating the user of the device on the equipment in response to the acquired first password corresponding to the received second password;
    the acquiring is carried out via a communication network; and
    in the event of an interruption in the communication network, a value of the second secret datum selected by the device depends on a duration of the interruption in order to correspond to a value used for computing the first password most recently acquired by the equipment.

10. The equipment as claimed in claim 9, wherein the equipment is a first equipment belonging to a pool of equipment and is provided with a unique identifier and wherein the instructions further configure the equipment to provide the device with the unique identifier.

11. A device comprising:
    at least one processor; and
    at least one non-transitory computer readable medium comprising instructions stored thereon which when executed by the at least one processor configure the device to execute a method of accessing an equipment, said equipment requiring a password in order to be accessed, a first password enabling access to the equipment having been computed from a first secret datum and acquired by the equipment, wherein:
    the method comprises:
        computing, by the device, a second password from a second secret datum; and
        transmitting, by the device, the second password to the equipment;
    the equipment accessed by the device acquires the first password via a communication network; and
    in the event of an interruption in the communication network, the device selects a value of the second secret datum depending on a duration of the interruption in order to correspond to a value used for computing the first password most recently acquired by the equipment.

12. The device as claimed in claim 11, wherein the instructions further configure the device to receive an identifier of the equipment, and compute the second password from the identifier and from the second secret datum.

13. A non-transitory computer readable data medium, on which a computer program is recorded comprising a sequence of instructions for implementing a management method when the computer program is loaded into and executed by a processor of an equipment, wherein the management method comprises:
    managing authentication of a user of a device, with the equipment being accessed by a password, wherein:
    the managing comprises the following phases:
        a phase of acquiring a first password by the equipment, the first password being a result of a computation from a first secret datum; and
        a phase of the user accessing the equipment, which phase comprises:
            the equipment receiving a second password computed by the device from a second secret datum; and
            authenticating the user of the device on the equipment in response to the second password received during the receiving corresponding to the first password acquired during the phase of acquiring;
    the phase of acquiring is carried out via a communication network; and
    in the event of an interruption in the communication network, a value of the second secret datum selected by the device depends on a duration of the interruption in order to correspond to a value used for computing the first password most recently acquired by the equipment.

14. A non-transitory computer readable data medium, on which a computer program is recorded comprising a sequence of instructions for implementing an access method when the computer program is loaded into and executed by a processor of a device, wherein the access method comprises:
    accessing an equipment by the device, said equipment requiring a password in order to be accessed, a first password enabling access to the equipment having been computed from a first secret datum and acquired by the equipment, wherein:
    the accessing comprises:
        computing, by the device, a second password from a second secret datum; and
        transmitting, by the device, the second password to the equipment;
    the equipment accessed by the device acquires the first password via a communication network; and
    the method comprises, in the event of an interruption in the communication network, the device selecting a value of the second secret datum depending on a duration of the interruption in order to correspond to a value used for computing the first password most recently acquired by the equipment.

\* \* \* \* \*